United States Patent
Kayserling

[15] 3,661,096
[45] May 9, 1972

[54] MOTORIZED RESILIENT DRIVE RAILWAY TRUCK

[72] Inventor: Ulrich Kayserling, Nurnberg, Germany
[73] Assignee: Maschinenfabrik Augsburg-Nurnberg Aktiengesellschaft, Nurnberg, Germany
[22] Filed: May 19, 1969
[21] Appl. No.: 825,804

[30] Foreign Application Priority Data

June 12, 1968  Austria ..............................A 5631/68

[52] U.S. Cl..............................105/117, 105/131, 105/135, 105/136
[51] Int. Cl.........................B61c 9/44, B61c 9/52, B61f 3/04
[58] Field of Search ..........................105/131, 135, 136, 117

[56] References Cited

UNITED STATES PATENTS

| 568,779 | 10/1896 | Lockwood..........................105/131 X |
| 2,404,115 | 7/1946 | Williams................................105/131 |

FOREIGN PATENTS OR APPLICATIONS

| 1,065,225 | 9/1959 | Germany.................................105/131 |
| 721,772 | 6/1942 | Germany.................................105/135 |
| 838,452 | 5/1952 | Germany.................................105/136 |
| 1,065,255 | 9/1959 | Germany |

Primary Examiner—Arthur L. La Point
Assistant Examiner—Howard Beltran
Attorney—Francis D. Stephens and Hugo Huettig, Jr.

[57] ABSTRACT

A motor transversely stabilized by links connected to the truck frame is mounted between two axles in a railway vehicle frame and having a drive shaft for each axle elastically coupled to its axle.

3 Claims, 2 Drawing Figures

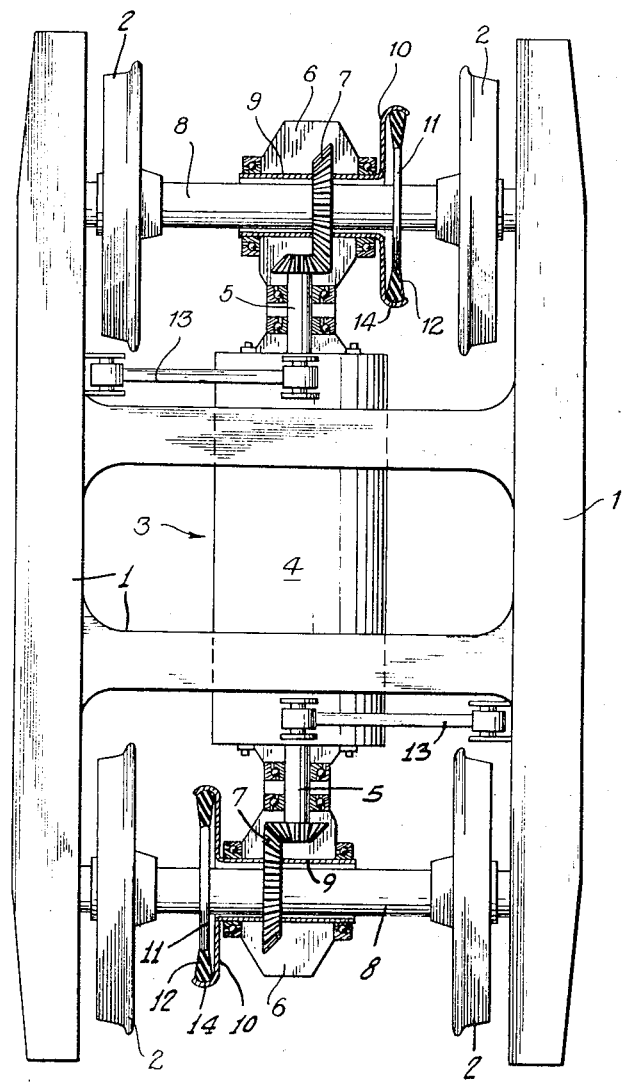
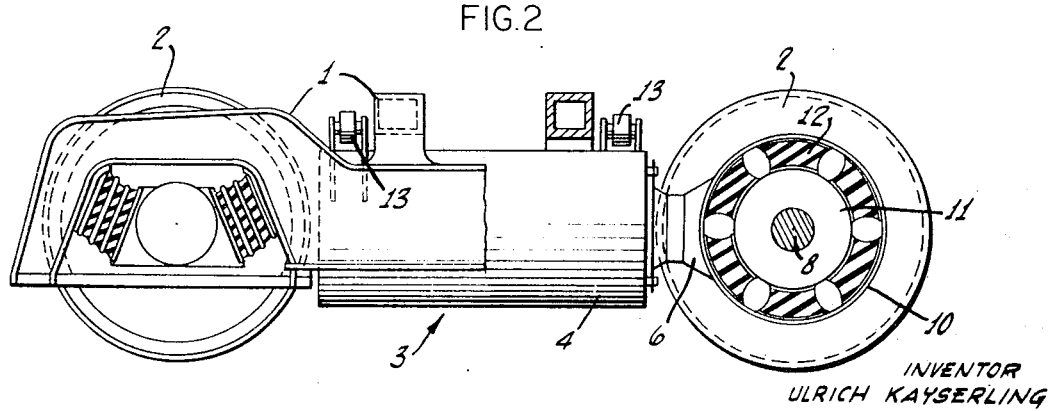

MOTORIZED RESILIENT DRIVE RAILWAY TRUCK

This invention relates to a drive for a railway vehicle having two or more axles with only a single engine mounted between two sets of wheels and connected to the wheels by bevel gears and in which the engine drive shafts extend longitudinally in opposite directions with the bevel gears being rigidly connected to the engine and elastically connected to the respective sets of wheels.

Heretofore, the engines for railway vehicles have been installed on pivotal mountings and the drive shafts connected to the wheels by means of beveled gears as disclosed in German Pat. No. 721,772. A drive of this type is composed of a single engine mounted longitudinally of the vehicle, which engine is connected to the forward set of wheels by a flanged or bevel gear. The engine is mounted between two sets of wheels and connected by oppositely extending drive shafts to each respective set of wheels. The axle for each wheel set is concentrically surrounded by a hollow shaft which supports the large gear of the bevel gear. This hollow shaft is joined to its respective wheel axle by a rubber coupling forming a self-sufficient power transmission. Each rubber coupling is formed of an annular flange and an annular disc between which is an annular rubber member and in which the annular flange is connected to the adjacent side of the hollow shaft and the annular disc with the wheel axle. This drive system connected to an electric motor is thus elastically supported by the rubber couplings on the wheel axles. Because of this elastic support on the wheels, the possibility of pivoting the drive with regard to the wheel axles exists so that the track unevenness, if the bumps are not too high, can be absorbed very easily and almost without jarring the vehicles driven over the bumps. However, it has been found that, despite the elastic coupling, the drive mass is still relatively hard-sprung and does not have sufficient give and that these rubber couplings permit only a very limited movement between the wheel axis and the motor, as disclosed in German Pat. No. 838,452.

In order to make possible an easy movement of the shaft, attempts have been made to subdivide the shaft into three parts and to join the individual parts by means of ball-like partial discs with intermediate layers of an elastic material. The radii of these ball-like partial discs and/or rubber couplings as constructed have their common center point on the center line of the shaft of the three shaft parts lying one after another. The engine driving force is transmitted by way of a disc positioned on the center portion of the shaft onto the actual shaft. This again results in a relatively hard spring suspension of the engine mass and drive and very little movement is possible between the engine and the wheel, as disclosed in German Pat. No. 1,065.225.

Another form of drive for a railway vehicle is composed of an engine positioned in the pivoting mounting mechanism of the vehicle as, for example, a motor spring-supported by the axle spring support with a hollow shaft and two endless worm gear drives mounted directly on the wheel sets and in which the motor drives the sets of wheels by means of universal joints connected to the worm gears for the axles which are constructed as a hollow shaft. Furthermore, a differential drive was connected to the motor by a flange, which drive is electromagnetically coupled through drive gears and which improves the uniform utilization of the friction between the wheel and the track. This offers the possibility of an improved spring support and shock absorption of the drive mechanism on the one hand and the installation of the differential on the other hand. However, this drive is quite complicated and expensive and includes moreover an axle drive which is not spring supported, as shown in the Prospectus of Durand-Drive.

A drive for a railway vehicle has been tried in which the motor is spring supported by the axle springs and is provided with two each axle drives rigidly connected in each case to the adjacent side by means of a flange, both of which are effective on the wheel sets and in which the driving force is transmitted from a large wheel positioned in the drive housing by way of a hollow universal shaft around the wheel axle onto the wheel disc, and in which the joint on the large wheel drive is composed of a joint lever coupling and the joint on the wheel disc of a rubber ring jacketed spring. As compared with the heretofore mentioned drives, this is a drive mechanism that is better spring supported, absorbs more shocks and gives an improved movement of the wheel axles with regard to the drive when going around curves in the tracks, and a complicated endless worm drive is avoided. However, this particular drive is generally more complicated and is more prone to need repairs as disclosed in German Gebrauchsmuster 1,962,052, Nov. 25, 1966.

Also, a rubber ring drive of axle and bar suspended or chassis motors has been used which is composed of an engine for each axle which is installed transverse of the longitudinal vehicle axis and which is supported on the side of a vehicle frame crossbeam by means of rubber springs so that, in contrast to the axle and bar suspended motor, the first can also be supported on the axles of the drive wheels by means of two rubber springs and be both vertically elastic as well as with regard to rotation. The rubber springs are attached on one hand to the wheel discs and on the other hand connected by bell-shaped extensions to the hollow shaft which also supports the large gear wheels. The hollow shaft is further positioned in the engine housing and surrounds the axle with clearance. The function and arrangement of this drive is quite similar to the drive described for the aforesaid German Pat. No. 838,452. While this drive is an improvement over the conventional and bar suspended motor, it is, however, hardly possible to use it in a longitudinally mounted one-engine drive as disclosed in the publication "Siemens-Magazine," Special Printing, 40th Year, Issue 11, Nov. 1966, pages 800 to 809.

Finally, two other further developments of the rubber ring spring drive are known, namely, the rubber ring universal drive and the rubber ring pendulum drive. Both are one-sided drives with the motors lying transverse to the longitudinal axis of the vehicle frame and which operate only one each set of drives.

In the rubber ring universal joint drive, the engine is rigidly mounted in the frame of the pivoting mounting mechanism, that is fully spring suspended from the spring suspension of the axle. This thus permits a large play of springs both vertically and transversely. The rotary movement or torque is transmitted by means of a one-sided drive and a hollow universal joint shaft which surrounds the drive axle onto the driving wheel. The large bevel gear is mounted on a hollow pin in the cylindrical bearing and which is connected with the motor. An annular rubber spring is used on the drive wheel side as the universal joint. This universal joint is composed of six guide members or again an annular rubber spring which, however, in contrast to the annular rubber spring drive, is positioned between the universal joint shaft and the large bevel gear. The construction of this drive between transmission and wheels is substantially the same as in the aforesaid Gebrauchsmuster Pat. No. 1,962,052.

The annular rubber ring pendulum type drive starts, as does the rubber ring spring drive, from the axle and bar suspended motor. The engine or motor, however, is not secured to the frame of the pivoting mounting mechanisms by way of springs but is suspended by means of two bolts on a broad basis on the crossbeam of the frame. On the side of the axle and bar suspended motor, it is supported by itself one-sidedly by means of a rubber ring spring on the driving wheel. As compared to the rubber ring spring drive, this eliminates the hollow shaft as well as the second large wheel member and the second rubber ring spring. The large wheel is, just as in the case with the rubber ring universal joint drive, positioned independently from the axle on a pin in the hollow shaft in the cylindrical bearing on the motor housing. A transverse positioning of the drive axle is made possible by a universal joint-like movement of the ring spring without affecting the motor.

The object of this invention is to produce a railway vehicle drive in which it is possible to obtain an extensive flexibility or tilting of the wheel base independently from the type of motor suspension and its drive.

In general, this object is obtained in that the driven wheel of each bevel gear is connected by means of one rubber ring spring and joints with the axle of each respective set of wheels for the elastic transmission of the torque movement from the engine onto the wheel and connecting the motor housing to the frame of the pivoting mounting mechanism by means of guide members or studs which act as supports for the rotary or twisting movement.

Further advantages are advantageously obtained by means of these features and techniques. The construction of this invention is simple and permits a universal joint-like movability of the driving axles. The one-sided positioning of the elastic coupling on each respective wheel axis makes possible a resilient spring suspension of the drive shaft and a flexibility for the wheel sets while the drive is as great as possible and only limited by the elasticity and strength of the rubber ring being used. A further advantage is obtained by the features of this invention in that the use of a rubber ring pendulum type drive is possible for motors which are aligned longitudinally of the vehicle frame and which drive at least two axles. Also, the elimination of the second half of each respective elastic coupling for each set of wheels reduces the initial cost of construction and the repair costs.

The means by which the objects of this invention are obtained are described more fully with reference to the accompanying schematic drawing in which:

FIG. 1 is a top plan view of the truck; and

FIG. 2 is a side elevation view of the truck partly shown in section.

On the railway vehicle pivoting frame 1 supported on two sets of wheels 2 is the drive system 3. This includes an electric motor or engine 4 connected to two oppositely extending drive shafts 5 and each of which ends in a bevel gear 6. These bevel gears 6 are fixed to the housing of motor 4 by means of a flange and are further connected to the large bevel gear 7 which, in turn, is joined to axle 8 concentrically surrounded by a hollow shaft 9. Each hollow shaft 9 on one end has an annular flange 10. An annular disc 11 is secured to axle 8. Between the flange 10 and disc 11 is a rubber ring 12. Flange 10, disc 11 and rubber ring 12 form an elastic coupling which is used to transmit and transfer the driving force of the engine to the sets of wheels. Each set of wheels 2 has only one coupling and the coupling of one set of wheels lies in the frame 1 diagonally opposite the other set of wheels. Engine 4 is connected through joints to two struts 13 and to the frame 1 so that the struts act as braces for the twisting or torque forces. The entire drive 3 is therefor supported by means of its elastic couplings, namely the flange 10, disc 11 and rubber ring 12 on the axle 8 of the wheel sets 2 in an elastic or resilient manner while the struts 13 stabilize the position of the drive 3.

As shown in the drawing, the struts 13 also are arranged diagonally with respect to each other across the frame 1. Consequently, this invention uses only one strut 13 on each side of the engine instead of two. Also, in this invention, the rubber ring can be secured between the sides of the flange 10 and disc 11 rather than between the circumferential edge of disc 11 and the inner surface of a rim 14 attached to flange 10. This would eliminate the rim 14 and gives the disc 11 a larger circumference which may be approximately the same as that of flange 10.

When more than two sets of wheels are used with the drive 3 within the framework 1, the drive 3 is positioned between the axles 8 of two wheel sets so that, for example, the third outermost axle runs along with the other axles without having a separate drive. Of course, it is possible within this invention that a further drive shaft is connected to one of the bevel gears 6 to drive a further bevel gear.

Having now described the means by which the objects of this invention are obtained,

I claim:

1. In a drive mechanism for a railway vehicle comprising a vehicle frame, at least two axles supporting said frame, wheels joined to said axles, a single motor between said axles, a drive shaft rigidly connected to said motor for each axle, a bevel gear joined to each drive shaft adjacent each axle, and elastic means for transferring the bevel gear movement to each axle, the improvement in which said elastic means is composed of a driven bevel gear connected to a single elastic coupling between the driven bevel gear and the axle for driving said axle, a separate transverse torque reaction strut adjacent each axle pivotally joining said motor to said frame for holding said motor against twisting in said frame, said bevel gear and its adjacent strut for one axle being positioned diagonally opposite the bevel gear and axle for the other axle relative to the center of the frame, and the weight of said motor, drive shaft, gears and coupling being supported solely upon said axles.

2. In a mechanism as in claim 1, said driven gear (7) being mounted on a hollow shaft (9) concentric with the axle, and said elastic coupling comprising a flange (10) joined to said hollow shaft and extending perpendicularly outwardly beyond the axle, an annular disc (11) connected to the axle, and an elastic member (12) connected between said flange (10) and said disc (11).

3. In a mechanism as in claim 2, further comprising a rim (14) on the periphery of said flange (10), and said elastic member being connected to the inner surface of said rim.

* * * * *